(12) United States Patent
Oh (10) Patent No.: US 9,420,185 B2
(45) Date of Patent: Aug. 16, 2016

(54) METHOD AND SYSTEM FOR COMPENSATING FOR IMAGE BLUR BY MOVING IMAGE SENSOR

(71) Applicant: HANWHA TECHWIN CO., LTD., Changwon-si (KR)

(72) Inventor: Jae-yoon Oh, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 338 days.

(21) Appl. No.: 13/779,858

(22) Filed: Feb. 28, 2013

(65) Prior Publication Data

US 2013/0278754 A1    Oct. 24, 2013

(30) Foreign Application Priority Data

Apr. 24, 2012    (KR) .................. 10-2012-0042715

(51) Int. Cl.
*H04N 7/18* (2006.01)
*H04N 5/232* (2006.01)
*H04N 5/272* (2006.01)

(52) U.S. Cl.
CPC ......... *H04N 5/23287* (2013.01); *H04N 5/2328* (2013.01); *H04N 5/23254* (2013.01); *H04N 5/272* (2013.01)

(58) Field of Classification Search
CPC .......... H04N 5/23287; H04N 5/23254; H04N 5/2328; H04N 5/272
USPC ................................ 348/135, 357
See application file for complete search history.

(56) References Cited

U.S. PATENT DOCUMENTS

| | | | |
|---|---|---|---|
| 5,969,760 A * | 10/1999 | Ernest et al. | 348/357 |
| 7,061,835 B2 | 6/2006 | Kobayashi | |
| 8,027,106 B2 * | 9/2011 | Kim et al. | 359/824 |
| 2005/0047672 A1 * | 3/2005 | Ben-Ezra et al. | 382/255 |
| 2008/0055413 A1 * | 3/2008 | Hayashi | 348/169 |
| 2010/0079602 A1 * | 4/2010 | Napper et al. | 348/208.1 |
| 2011/0261225 A1 * | 10/2011 | Niinami | G06T 7/204 348/223.1 |

FOREIGN PATENT DOCUMENTS

| | | | |
|---|---|---|---|
| JP | 08161466 | * | 6/1996 |
| JP | 8161466 A | | 6/1996 |
| JP | 2002203324 A | | 7/2002 |
| KR | 1020090132209 A | | 12/2009 |
| KR | 1020110074752 A | | 7/2011 |

OTHER PUBLICATIONS

Xu Ting-Fa, Object's translation speed measurement using motion blur information, Elsevier, vol. 43, Issue 9, Nov. 2010, pp. 1173-1179.*

* cited by examiner

*Primary Examiner* — Allen Wong
(74) *Attorney, Agent, or Firm* — Sughrue Mion, PLLC (57) ABSTRACT

A system for compensating for image blur, the system including: a movement detector which an appearance of a subject moving in a surveillance range in order to calculate a movement distance and speed determines movement characteristics of a subject on a display of a camera which obtains an image of the object; a calculator which determines moving characteristics of an image sensor based on the movement characteristics of the subject; and a moving unit which moves the image sensor for an exposure time of at least one predetermined frame based on the moving characteristics of the image sensor.

13 Claims, 7 Drawing Sheets

METHOD AND SYSTEM FOR COMPENSATING FOR IMAGE BLUR BY MOVING IMAGE SENSOR

CROSS-REFERENCE TO RELATED PATENT APPLICATION

This application claims priority from Korean Patent Application No. 10-2012-0042715, filed on Apr. 24, 2012, in the Korean Intellectual Property Office, the disclosure of which is incorporated herein in its entirety by reference.

BACKGROUND

1. Field

Methods and apparatuses consistent with exemplary embodiments relate to compensating for image blur by moving an image sensor, and more particularly, to compensating for image blur by moving an image sensor after calculating a moving distance and a moving speed of the image sensor based on movement distance and speed of a subject on a camera screen.

2. Description of the Related Art

For a surveillance camera to obtain an image of a subject, an image sensor is exposed to light for a predetermined time to obtain one image frame. When a moving subject is captured, the subject does not stand still, and thus, image blur may be generated due to movement of the subject. In this case, information about the moving subject may be lost in a captured image, and thus, the surveillance camera may not operate properly.

SUMMARY

One or more exemplary embodiments provide a method and system for compensating for image blur by moving an image sensor after calculating a moving distance and a moving speed of the image sensor based on a movement distance and speed of a subject on a camera screen or display.

According to an aspect of an exemplary embodiment, there is provided a system for compensating for image blur, the system including: a movement detector which an appearance of a subject moving in a surveillance range in order to calculate a movement distance and speed determines movement characteristics of a subject on a display of a camera which obtains an image of the object; a calculator which determines moving characteristics of an image sensor based on the movement characteristics of the subject; and a moving unit which moves the image sensor for an exposure time of at least one predetermined frame based on the moving characteristics of the image sensor.

The movement characteristics of the subject may include a movement distance and speed of the subject on the display, and the moving characteristics of the image sensor may include a moving distance and speed of the image sensor with respect to a direction of a lens of the camera within the camera.

The moving unit may move the image sensor with respect to the direction of the lens of the camera within the camera for the exposure time of the predetermined frame so that a given pixel of the image sensor outputs an image of a same portion of the subject regardless of the moving of the subject in the surveillance region.

The moving unit may include a piezoelectric element.

The image sensor may be moved to an original position during a vertical synchronization time between the predetermined frame and a following frame of the predetermined frame.

The moving distance of the image sensor may be calculated by multiplying a number of pixels of the image sensor corresponding to the movement distance of the subject on the display to a unit cell size of the image sensor.

The moving speed of the image sensor may be calculated by dividing the moving distance of the image sensor by the exposure time.

If a background of an image of the subject obtained by moving the image sensor is blurred, the background may be replaced.

The movement detector may set at least one frame, having a given frame interval, at which the movement detector determines the movement characteristics of the subject, and the moving unit may move the image sensor for the exposure time of the at least one predetermined frame which is at least one frame provided during the given frame interval According to an aspect of another exemplary embodiment, there is provided a method of compensating for image blur, the method including: determining movement characteristics of a subject on a display of a camera which obtains an image of the subject; determining moving characteristics of an image sensor based on the movement characteristics of the subject; and moving the image sensor for an exposure time of at least one predetermined frame based on the moving characteristics of the image sensor.

The movement characteristics of the subject may include a movement distance and speed of the subject on the display, and the moving characteristics of the image sensor may include a moving distance and speed of the image sensor with respect to a direction of a lens of the camera within the camera.

The moving the image sensor may include moving the image sensor with respect to the direction of the lens of the camera within the camera for the exposure time of the predetermined frame so that a given pixel of the image sensor outputs an image of a same portion of the subject regardless of the moving of the subject in the surveillance region.

The method may further include moving the image sensor to an original position during a vertical synchronization time between the predetermined frame and a following frame of the predetermined frame.

The moving distance of the image sensor may be calculated by multiplying a number of pixels of the image sensor corresponding to the movement distance of the subject on the display to a unit cell size of the image sensor.

The moving speed of the image sensor may be calculated by dividing the moving distance of the image sensor by the exposure time.

If a background of an image objected by moving the image sensor is blurred, the background may be replaced.

The method may further include setting at least one frame, having a given frame interval, at which the movement characteristics of the subject is determined, wherein the moving the image sensor may include moving the image sensor for the exposure time of the at least one predetermined frame which is at least one frame provided during the given frame interval.

BRIEF DESCRIPTION OF THE DRAWINGS

The above and other aspect will become more apparent by describing in detail exemplary embodiments with reference to the attached drawings, in which.

DETAILED DESCRIPTION OF THE EXEMPLARY EMBODIMENTS

Hereinafter, exemplary embodiments of the inventive concept will be described more fully with reference to the accompanying drawings. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. In the drawings, like reference numerals denote like elements.

Figure 1A:
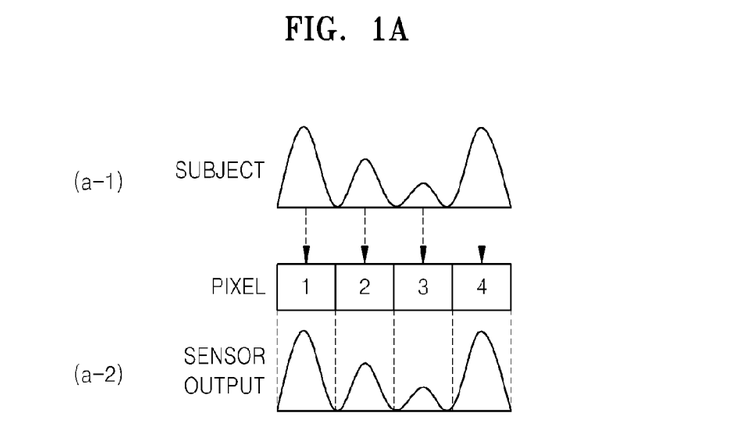
FIGS. 1A and 1B show diagrams for describing blurring of a subject photographed with a general camera.
Figure 1B:
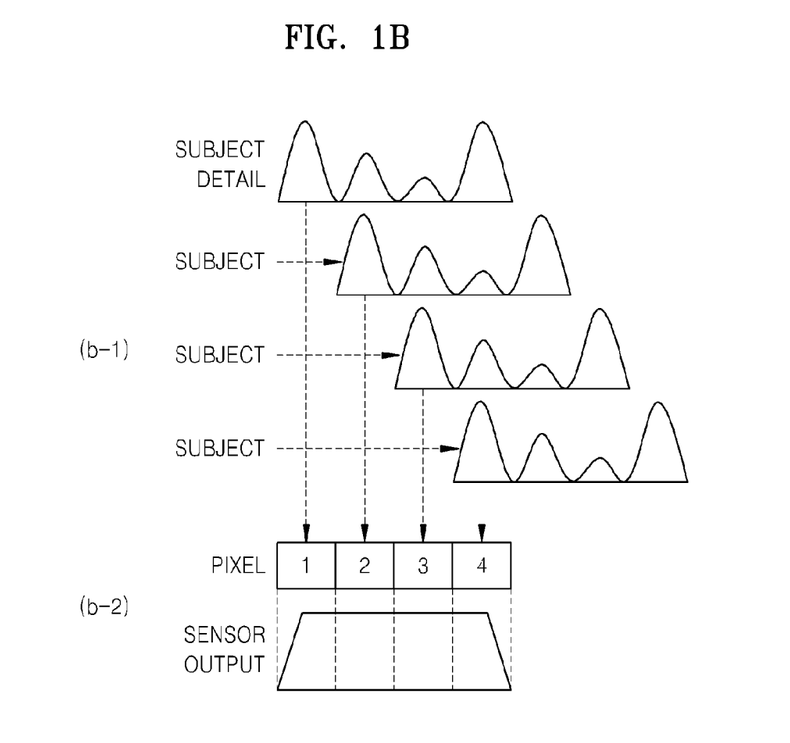

FIGS. 1A and 1B are diagrams for describing blurring of a subject photographed or captured with a general camera.

First, FIG. 1A shows a result of outputting a photographed subject on an image sensor when the subject is not moving, and FIG. 1B shows a result of outputting a photographed subject on the image sensor when the subject is moving.

Referring to FIG. 1A, the subject having a shape (a-1) is output on the image sensor as shown in (a-2) at pixels corresponding to a location of the subject when the subject is not moving.

On the other hand, referring to FIG. 1b, since values of the moving subject as shown in (b-1) displayed at respective pixel positions change during a predetermined period when a frame is exposed, values of the moving subject output at certain pixels of an image sensor change as shown in (b-2). In other words, since values output at first through fourth pixels overlap as the subject moves, an original shape of the subject is not accurately displayed, an output value of the image sensor is changed, and image blur is generated.

According to an exemplary embodiment, in order to compensate for blur of the moving subject, the image sensor is also moved at a movement speed of the subject so that an accurate output image of the moving subject is obtained.

Figure 2:
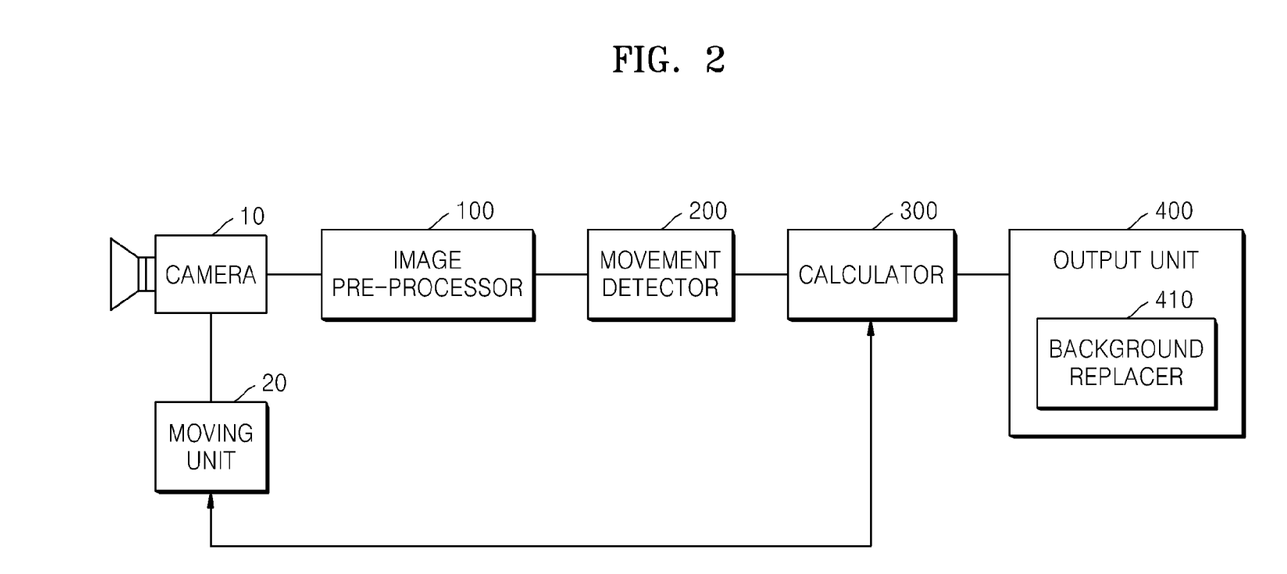
FIG. 2 is a block diagram of a system for compensating for image blur, according to an exemplary embodiment.

FIG. 2 is a block diagram of a system for compensating for image blur, according to an exemplary embodiment.

Referring to FIG. 2, the system for compensating for image blur by moving an image sensor may include a camera 10, a moving unit 20, an image pre-processor 100, a movement detector 200, a calculator 300, and an output unit 400.

First, the camera 10 is an imaging device for obtaining an image of an image target, and according to an exemplary embodiment, the camera 10 may be a network camera that transmits a moving image in real time. Alternatively, the camera 10 may be an imaging device, such as a closed-circuit television (CCTV) or a camcorder, installed at a location to be to be monitored by a surveillance system. The camera 10 includes an image sensor (not shown) that converts an imaging result into an electric image signal.

In the current embodiment, the image sensor provided inside the camera 10 may be moved by the moving unit 20 by a value proportional to a movement distance and speed of a subject during one frame as described below. The moving unit 20 controls the movement of the image sensor. A method of moving the image sensor and a structure of the moving unit 20 will be described below in detail.

Next, the image pre-processor 100 converts input data provided from the camera 10 from an analog signal to a digital signal. Although the image pre-processor 100 is located outside the camera 10 in FIG. 2, the image pre-processor 100 may be provided inside the camera 10, together with the image sensor. Also, the image pre-processor 100 may include a decoder (not shown) for converting an analog input image to a digital image.

Next, the movement detector 200 detects an appearance of the subject moving in a surveillance range and calculates a movement distance and speed of the subject on a screen of the camera 10. In detail, when the subject moves, the number of blurred pixels is calculated by calculating a distance of the subject that moves in the entire screen based on a movement distance and speed of the subject during an exposure time of one frame.

Hereinafter, a process of the movement detector 200 calculating the number of blurred pixels is described, and for convenience of description, it is assumed that the subject moves only in a horizontal direction in the screen of the camera 10. When object_move denotes an actual movement distance of the subject in the screen during the exposure time of one frame, object_move may be represented by Equation 1 below:

$$\text{object\_move} = V \cdot T \quad \text{[Equation 1]}$$

In Equation 1, V denotes a speed of the subject on the screen and T denotes the exposure time of one frame of the camera 10.

The number of pixels corresponding to movement of the subject in one frame, i.e., the number of blurred pixels in the image, is determined based on Equation 1. The number of blurred pixels is related to a movement distance of the subject in one frame with respect to a size of the entire image. When pixel_blur denotes the number of blurred pixels, a relationship between pixel_blur and object_move may be represented by Equation 2 below:

$$H : \text{object\_move} = PN\_H : \text{pixel\_blur} \quad \text{[Equation 2]}$$

In Equation 2, H denotes a horizontal distance of a background on the screen of the camera 10, and PN_H denotes a number of horizontal pixels of the image sensor of the camera 10. In other words, a ratio of a horizontal screen length of the camera 10 and a movement distance of the subject during the exposure time is identical to a ratio of the number of horizontal pixels of the image sensor and the number of blurred pixels.

When Equation 1 is used in Equation 2, the number of blurred pixels in the image of the camera 10 is determined by Equation 3 below:

$$\text{pixel\_blur} = \frac{\text{object\_move} \cdot PN\_H}{H} = \frac{V \cdot T \cdot PN\_H}{H} \quad \text{[Equation 3]}$$

As shown in Equation 3, the movement detector 200 calculates the number of blurred pixels based on the speed of the moving subject in the image, the exposure time, the horizontal distance of the image, and the number of horizontal pixels of the image sensor.

Figure 3:
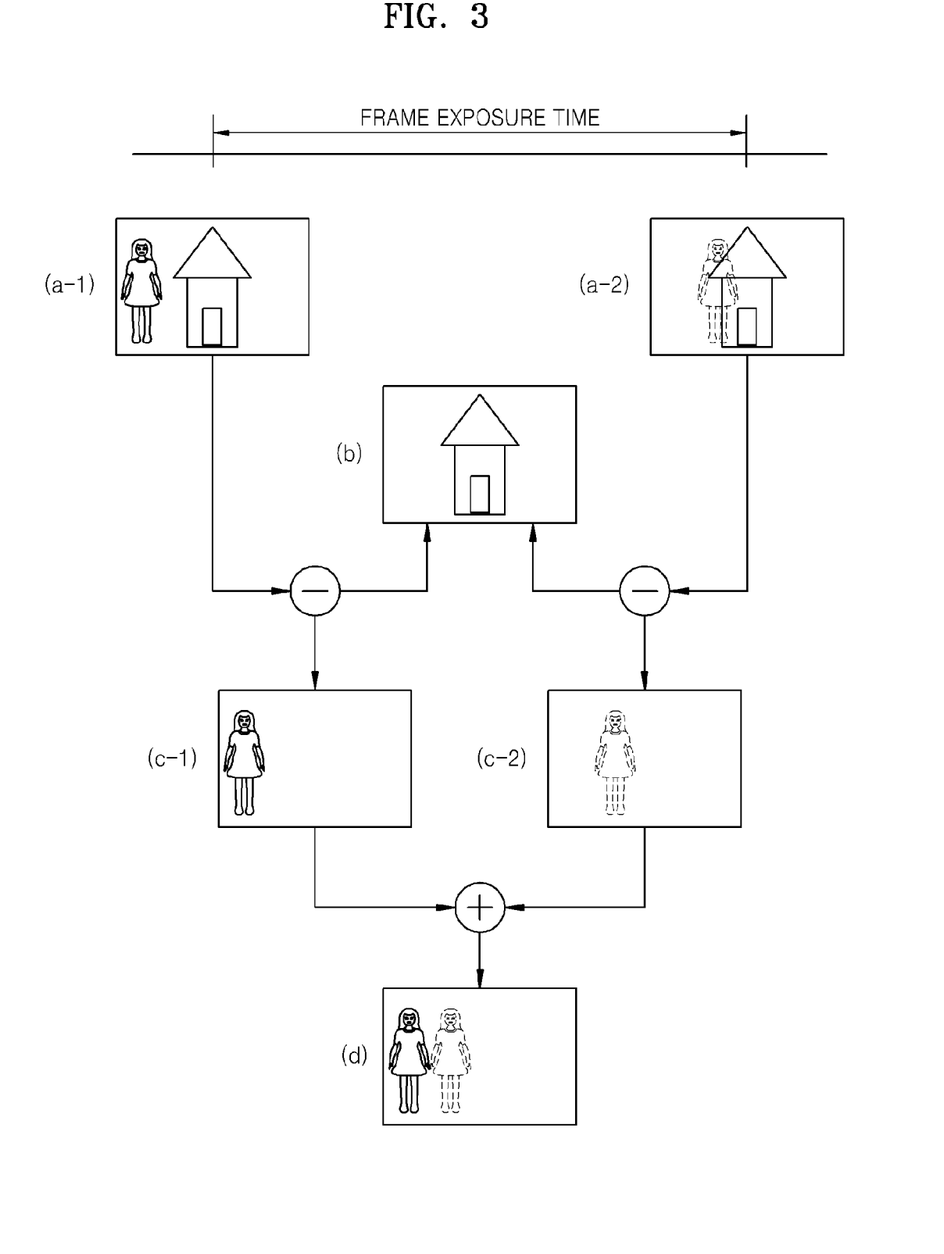
FIG. 3 is a diagram for describing a process of calculating a movement distance and speed of a subject, according to an exemplary embodiment.

FIG. 3 is a diagram for describing a process of calculating a movement distance and speed of a subject, according to an exemplary embodiment.

Referring to images (a-1) and (a-2) in FIG. 3, the subject moves during an exposure time of one frame in an image taken by the camera 10. The movement detector 200 obtains images (c-1) and (c-2) including only the moving subject by removing an image (b) including only a background. Here, the background in the image (b) may constantly stand still before the subject moves in the screen with respect to the background.

Then, the movement detector 200 calculates the movement distance and speed of the moving subject by combining the images (c-1) and (c-2) including only the moving subject. As described above, the movement speed of the subject may be calculated by dividing a distance of the subject moving during one frame in an image by an exposure time.

Next, the calculator 300 may calculate a moving distance and a moving speed of an image sensor based on the movement distance and the movement speed of the subject. According to an exemplary embodiment, the image sensor is minutely movable by a piezoelectric element. The calculator 300 calculates a value for moving the image sensor by a number of blurred pixels that so as to compensate for blur caused by the moving subject in the image.

When IS_move denotes the moving distance of the image sensor, IS_move may be calculated according to Equation 4 below:

$$\text{IS\_move} = \text{pixel\_blur} \cdot \text{UCS\_H} \quad \text{[Equation 4]}$$
$$= \frac{V \cdot T \cdot \text{PN\_H}}{H} \cdot \text{UCS\_H}$$

In Equation 4, UCS_H denotes a horizontal unit cell size of the image sensor. In other words, the moving distance of the image sensor is calculated by multiplying the number of pixels corresponding to the movement of subject in the image sensor, i.e., the number of blurred pixels, by the horizontal unit cell size of the image sensor.

Also, when IS_v denotes the moving speed of the image sensor, IS_v may be calculated according to Equation 5 below:

$$\text{IS\_v} = \frac{\text{IS\_move}}{T} \quad \text{[Equation 5]}$$
$$= \frac{V \cdot T \cdot \text{PN\_H} \cdot \text{UCS\_H}}{H \cdot T}$$

As described above, since T denotes an exposure time of one frame during photographing, the moving speed of the image sensor may be calculated by dividing the moving distance of the image sensor by the exposure time.

The calculator 300 provides the calculated moving distance and moving speed of the image sensor to the moving unit 20 that adjusts the image sensor of the camera 10. The moving unit 20 moves the image sensor during the exposure time of the frame based on the moving distance and moving speed of the image sensor. According to an exemplary embodiment, a moving element for moving the image sensor may be a piezoelectric element. The piezoelectric element may minutely move the image sensor according to a small amount of an input value.

Figure 4:
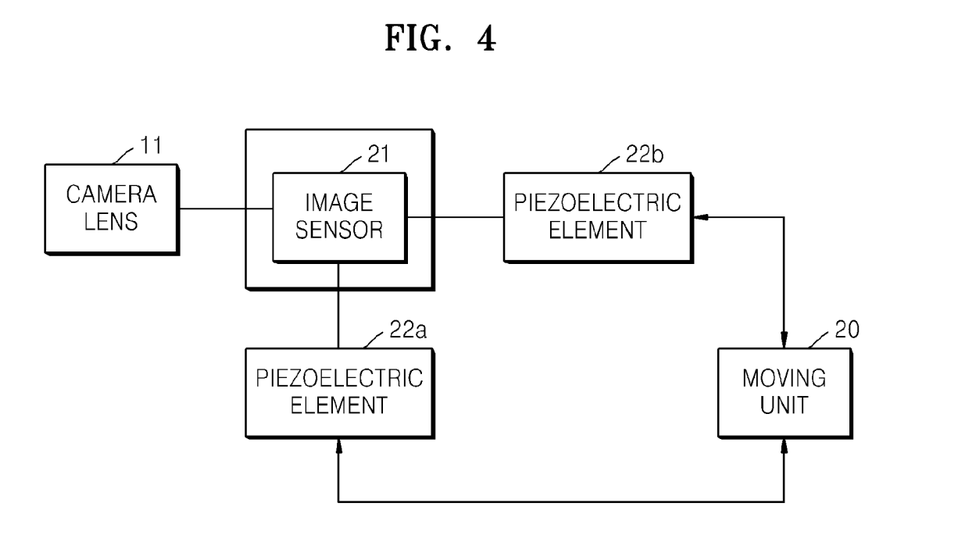
FIG. 4 is a diagram for describing an arrangement of an image sensor and piezoelectric elements, according to an exemplary embodiment.

FIG. 4 is a diagram for describing an arrangement of a camera lens 11, the moving unit 20 of FIG. 2, an image sensor 21 and piezoelectric elements 22a and 22b, according to an exemplary embodiment.

Referring to FIG. 4, the image sensor 21 is disposed inside a camera. According to an exemplary embodiment, a space where the image sensor 21 is movable up, down, left, or right, exists inside the camera while the camera lens 11 is directed to a fixed direction. Also, the piezoelectric element 22a for an up-and-down direction and the piezoelectric element 22b for a right-and-left direction in FIG. 3 may move the image sensor 21 respectively in an up-and-down direction and a right-and-left direction. Here, the image sensor 21 moves with respect to the camera lens 11. That is, the movement of the image sensor 21 may be independent from movement of the camera lens 11 when a direction of the camera lens 11 changes. The moving unit 20 and the calculator 300 may communicate with each other to receive data about the moving distance and the moving speed of the image sensor 21, and control the piezoelectric elements 22a and 22b.

Also, the moving unit 20 moves the image sensor 21 as described above during the exposure time of one frame, and moves the image sensor 21 to an original position during a vertical synchronization time between the frame and a following frame.

Referring back to FIG. 2, the output unit 400, which may comprises a display or screen, outputs an image where blur is compensated for as described above. The output unit 400 may include a background replacer 410. The background replacer 410 may replace a background when the background is blurred due to the movement of the image sensor.

When the image sensor moves based on the movement distance and speed of the subject, the background excluding the moving subject may be blurred. In other words, when the image sensor is moved during the exposure time of one frame, the background may be blurred as if it has moved. In order to prevent blur from being output on the background, the background replacer 410 in the output unit 400 replaces the background excluding the moving subject. The background replacer 410 may replace the background with one that has been repeatedly captured for predetermined frames by the camera 10 before the moving object appeared.

As described above, the image sensor may be moved during the exposure time of the frame by calculating the moving distance and moving speed of the image sensor based on the movement distance and movement speed of the subject, and returning the image sensor back to the original position during the vertical synchronization time between frames.

Alternatively, according to another exemplary embodiment, the image sensor may be moved by calculating the movement of the subject at predetermined frame intervals to use the calculated movement across other frames without having to calculate the movement of the subject for each frame.

In other words, when the movement of the subject is calculated at n frame intervals, (0-th, n-th, 2n-th, 3n-th, . . . ) frames and so on are set as movement detecting frames and the movement of the subject is detected to calculate the movement distance and speed of the subject. Also, the image sensor is moved in other (1st, 2nd, . . . , (n−1)-th, (n+1)-th, (n+2)-th, . . . , (2n−1)-th, (2n+1)-th, . . . ) frames. Here, the moving distance and the moving speed of the image sensor respectively refer to the moving distance and the moving speed calculated from the latest movement detecting frame. For example, the moving distance and the moving speed of the image sensor in the ((n+1)-th, (n+2)-th, ..., (2n−1)-th) frames is derived from the movement of the subject calculated in the n-th frame.

The other exemplary embodiment described above is used since the subject mostly moves at almost constant speed from the appearance to disappearance on the screen of the camera 10. When the moving distance and the moving speed of the image sensor is determined based on the movement speed and distance of the subject only in frames at predetermined intervals, a process efficiency may be increased as a calculation amount for driving a system is decreased.

Figure 5:
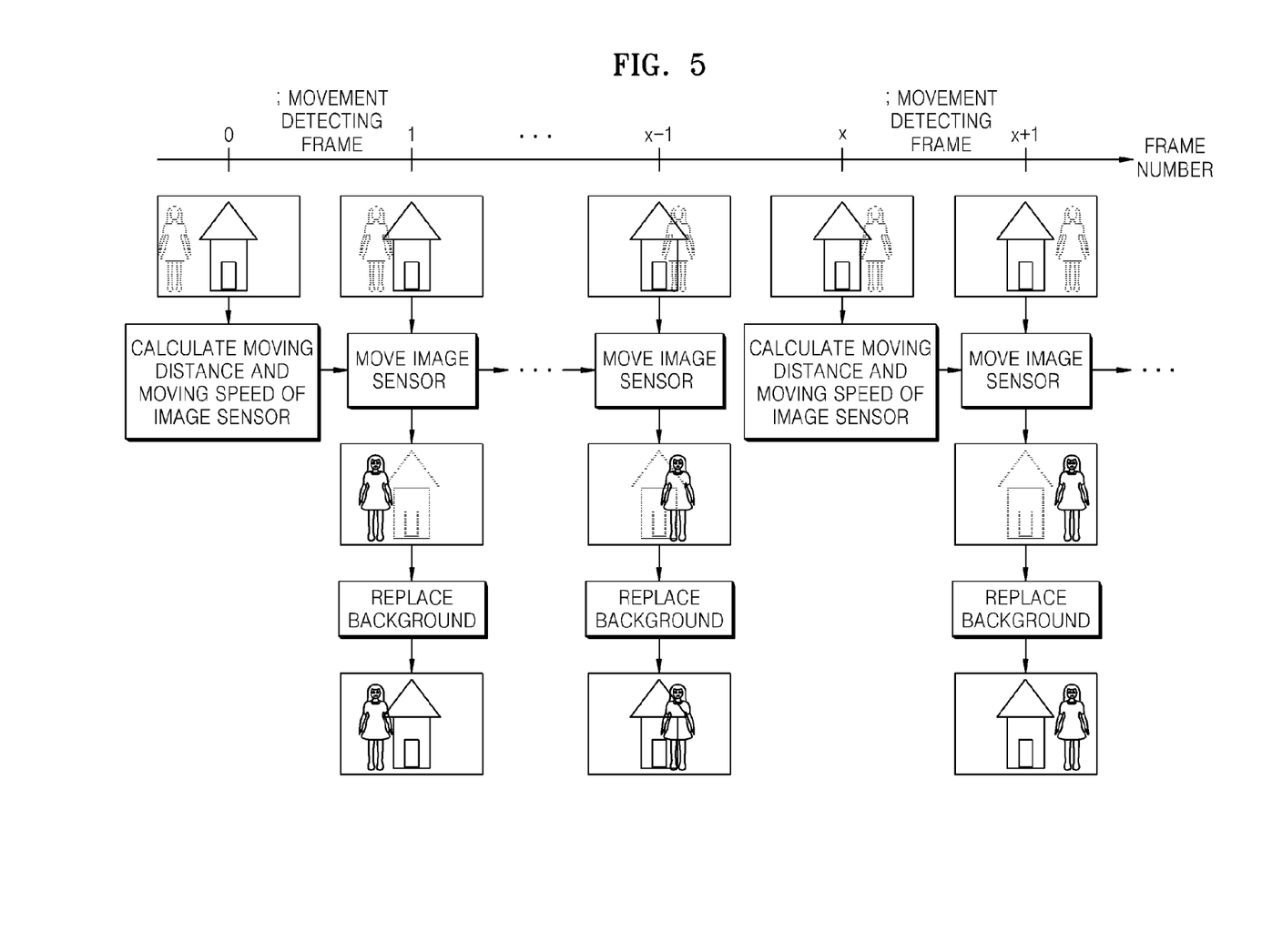
FIG. 5 is a diagram for describing a process of compensating for image blur, according to an exemplary embodiment.

FIG. 5 is a diagram for describing a process of compensating for image blur, according to an exemplary embodiment.

Referring to FIG. 5, first, the movement detector 200 sets (0-th, n-th, 2n-th, 3n-th, ...) frames as movement detecting frames at n frame intervals. Then, the movement distance and speed of the subject are calculated as shown in FIG. 3 in the 0-th frame to calculate the moving distance and the moving speed of the image sensor. In other words, the movement detecting frame is a frame for obtaining the moving distance and the moving speed of the image sensor, and the image sensor is not moved in the movement detecting frame.

Next, the image sensor is moved according to the moving distance and the moving speed of the image sensor calculated in the 0th frame in the first through (n−1)-th frames. As a result, blur of the subject moving in the image may be compensated for. However, when the image sensor moves as shown in FIG. 5, the movement of the subject may be compensated for, however, the background may be blurred since the background maintains the same location during the exposure time.

Accordingly, the background replacer 410 may replace the background of the image where the background is blurred due to the movement of the image sensor. As a result, an output image in which blur is compensated for with regard to the movements of both the background and subject may be obtained.

As such, blur of the moving subject is compensated for by moving the image sensor during the exposure time in the first through (n−1)-th frames based on the moving distance and the moving speed of the image sensor calculated in the 0-th frame.

Repeatedly, the movement distance and speed of the subject moving in the n-th, 2n-th, and 3n-th frames that are movement detecting frames are detected to calculate the moving distance and the moving speed of the image sensor, and the moving unit 20 moves the image sensor based on the moving distance and the moving speed of the image sensor calculated in the n-th, 2n-th, and 3n-th frames. Also, when the background is blurred by moving the image sensor, the background replacer 410 replaces the background.

Figure 6:
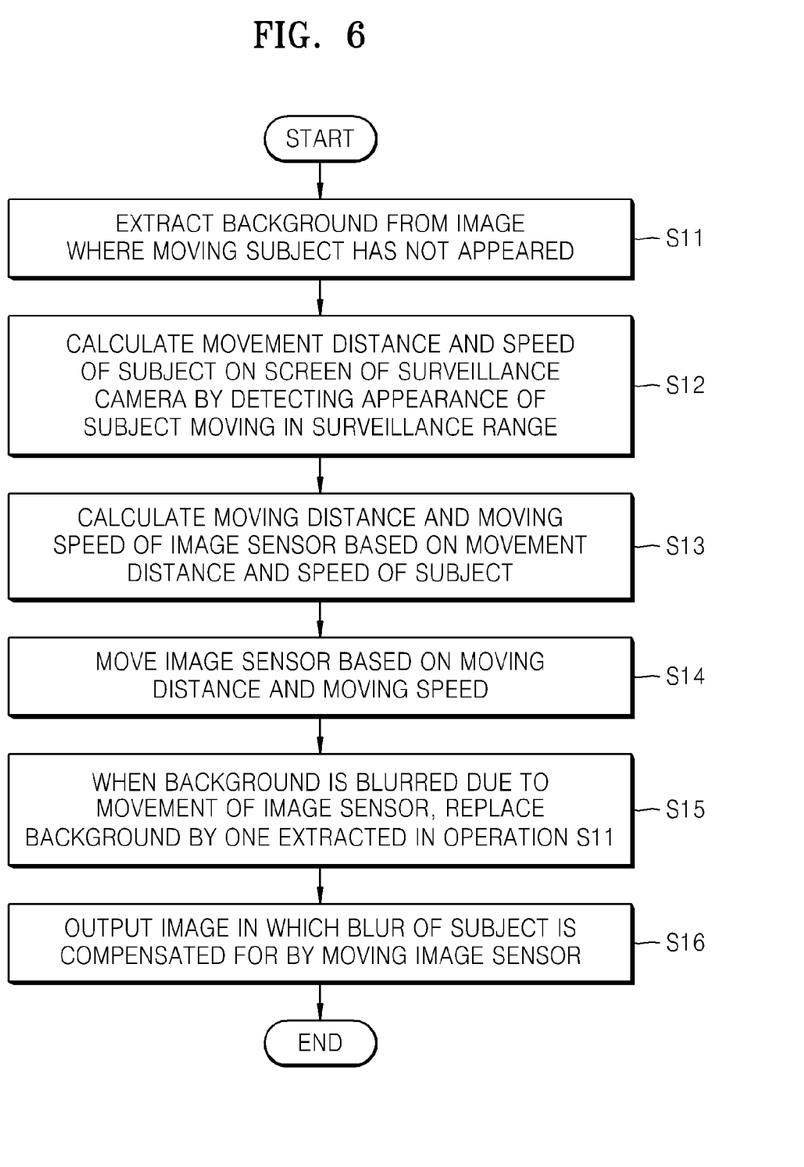
FIG. 6 is a flowchart illustrating a method of moving an image sensor based on movement of a subject, according to an exemplary embodiment.

FIG. 6 is a flowchart illustrating a method of moving an image sensor based on movement of a subject, according to an exemplary embodiment.

Referring to FIG. 6, a background which stands still is extracted from an image where a moving subject has not appeared in operation S11.

Then, appearance of the moving subject is detected in a surveillance range, and a movement distance and speed of the moving subject on a screen of the surveillance camera are calculated in operation S12.

Then, a moving distance and a moving speed of an image sensor are calculated based on the movement distance and speed of the subject in operation S13.

Then, the image sensor is moved based on the moving distance and the moving speed in operation S14.

Then, when a background is blurred due to the movement of the image sensor, the background is replaced in operation S15 by the background extracted in operation S11.

Then, the output unit 400 outputs an image in which the blur of the moving subject is compensated for by moving the image sensor in operation S16.

Figure 7:
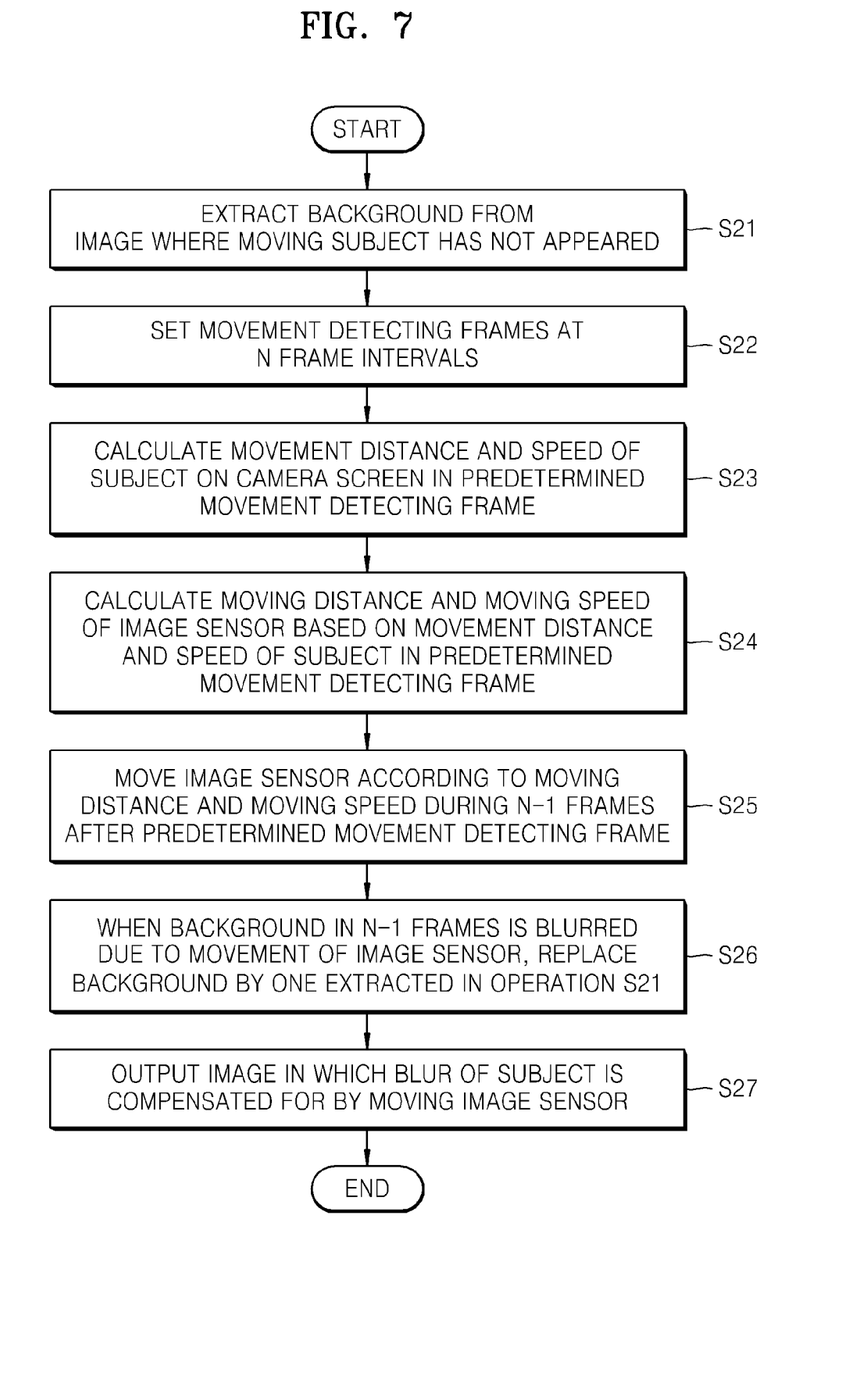
FIG. 7 is a flowchart illustrating a method of moving an image sensor based on movement of a subject, according to another exemplary embodiment.

FIG. 7 is a flowchart illustrating a method of moving an image sensor based on movement of a subject, according to another exemplary embodiment.

First, a background which stands still is extracted from an image where a moving subject has not appeared in operation S21.

Then, movement detecting frames are set at n frame intervals considering a calculation amount, in operation S22.

Then, a movement distance and speed of the moving subject on a camera screen are calculated in a predetermined movement detecting frame, in operation S23.

Then, a moving distance and a moving speed of an image sensor are calculated based on the movement distance and speed of the moving subject in the predetermined movement detecting frame, in operation S24.

Then, the image sensor is moved according to the moving distance and the moving speed during n−1 frames after the predetermined movement detecting frame, in operation S25.

Then, when a background is blurred in the n−1 frames due to the movement of the image sensor, the background is extracted in operation S26 to the one extracted in operation S21.

Lastly, the output unit 400 outputs an image in which blur of the moving subject is compensated for by moving the image sensor in operation S27.

According to the above exemplary embodiments, image blur can be compensated for by moving an image sensor after calculating a moving distance and a moving speed of the image sensor based on a movement distance and speed of a subject on a camera screen. While the above exemplary embodiments are described for a case in which a subject is moving, the inventive concept may also apply to a case in which a camera obtaining images of the subject is moving while the subject stands still to generate image blur.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A system for compensating for image blur, the system comprising:
   a movement detector configured to detect an appearance of a subject moving in a surveillance range in a direction horizontal to a display of a camera in order to calculate movement characteristics of the subject on the display of the camera which obtains an image of the object;
   a calculator configured to determine moving characteristics of an image sensor provided inside a body of the camera in proportion to the movement characteristics of the subject; and
   a moving unit configured to move the image sensor independently from the body of the camera for an exposure time of at least one predetermined frame based on the moving characteristics of the image sensor,
   wherein the movement characteristics of the subject comprise a movement distance and speed of the subject on the display, and wherein the moving characteristics of the image sensor comprise a moving distance and speed of the image sensor with respect to a direction of a lens of the camera within the camera, wherein the moving unit is further configured to move the image sensor with respect to the direction of the lens of the camera within the camera for the exposure time of the predetermined frame while the lens of the camera is directed to a fixed direction so that a given pixel of the image sensor outputs an image of a same portion of the subject regardless of the moving of the subject in a surveillance region.

2. The system of claim 1, wherein the moving unit is connected to a piezoelectric element.

3. The system of claim 1, wherein the image sensor is moved to an original position during a vertical synchronization time between the predetermined frame and a following frame of the predetermined frame.

4. The system of claim 1, wherein the moving distance of the image sensor is calculated by multiplying a number of pixels of the image sensor corresponding to the movement distance of the subject on the display to a unit cell size of the image sensor.

5. The system of claim 1, wherein the moving speed of the image sensor is calculated by dividing the moving distance of the image sensor by the exposure time.

6. The system of claim 1, wherein, if a background of an image of the subject obtained by moving the image sensor is blurred, the background is replaced.

7. The system of claim 1, wherein the movement detector sets at least one frame, having a given frame interval, at which the movement detector determines the movement characteristics of the subject, and wherein the moving unit moves the image sensor for the exposure time of the at least one predetermined frame which is at least one frame provided during the given frame interval.

8. A method of compensating for image blur, the method comprising:

determining movement characteristics of a subject in a direction horizontal to a display of a camera which obtains an image of the subject;

determining moving characteristics of an image sensor provided inside a body of the camera in proportion to the movement characteristics of the subject; and moving the image sensor independently from the body of the camera for an exposure time of at least one predetermined frame based on the moving characteristics of the image sensor, wherein the movement characteristics of the subject comprise a movement distance and speed of the subject on the display, and wherein the moving characteristics of the image sensor comprise a moving distance and speed of the image sensor with respect to a direction of a lens of the camera within the camera, wherein the moving the image sensor comprises moving the image sensor with respect to the direction of the lens of the camera within the camera for the exposure time of the predetermined frame while the lens of the camera is directed to a fixed direction so that a given moving of the subject in a surveillance region.

9. The method of claim 8, further comprising moving the image sensor to an original position during a vertical synchronization time between the predetermined frame and a following frame of the predetermined frame.

10. The method of claim 8, wherein the moving distance of the image sensor is calculated by multiplying a number of pixels of the image sensor corresponding to the movement distance of the subject on the display to a unit cell size of the image sensor.

11. The method of claim 8, wherein the moving speed of the image sensor is calculated by dividing the moving distance of the image sensor by the exposure time.

12. The method of claim 8, further comprising:

determining whether a background of an image obtained by moving the image sensor is blurred; and if it is determined that the background is blurred, replacing the background.

13. The method of claim 8, further comprising setting at least one frame, having a given frame interval, at which the movement characteristics of the subject are determined, and wherein the moving the image sensor comprises moving the image sensor for the exposure time of the at least one predetermined frame which is at least one frame provided during the given frame interval.

* * * * *